Aug. 8, 1967  R. C. RUSSELL  3,334,713
AUTOMATIC BRAKE ADJUSTER
Filed Jan. 21, 1966  4 Sheets-Sheet 3
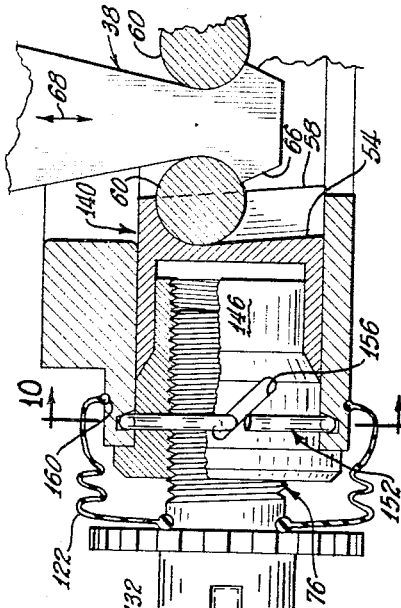
Fig. 9
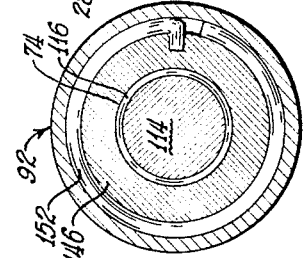
Fig. 10
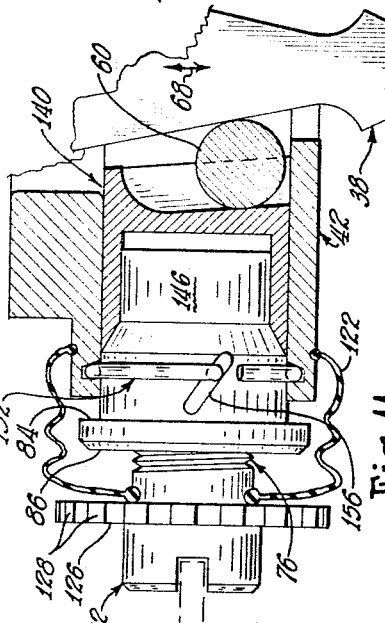
Fig. 11
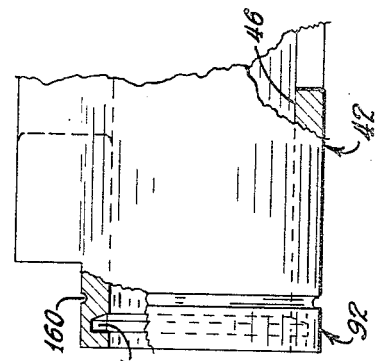
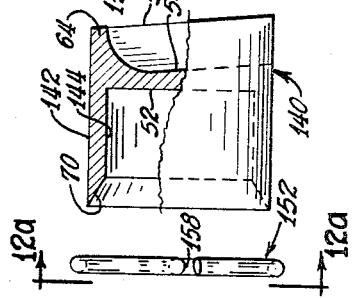
Fig. 12a
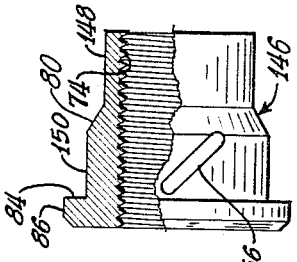
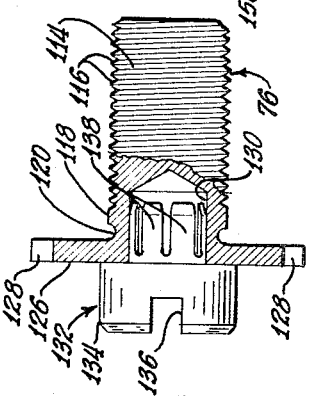
Fig. 12
INVENTOR.
ROBERT C. RUSSELL
BY
Schramm, Kramer & Sturgis
ATTORNEYS

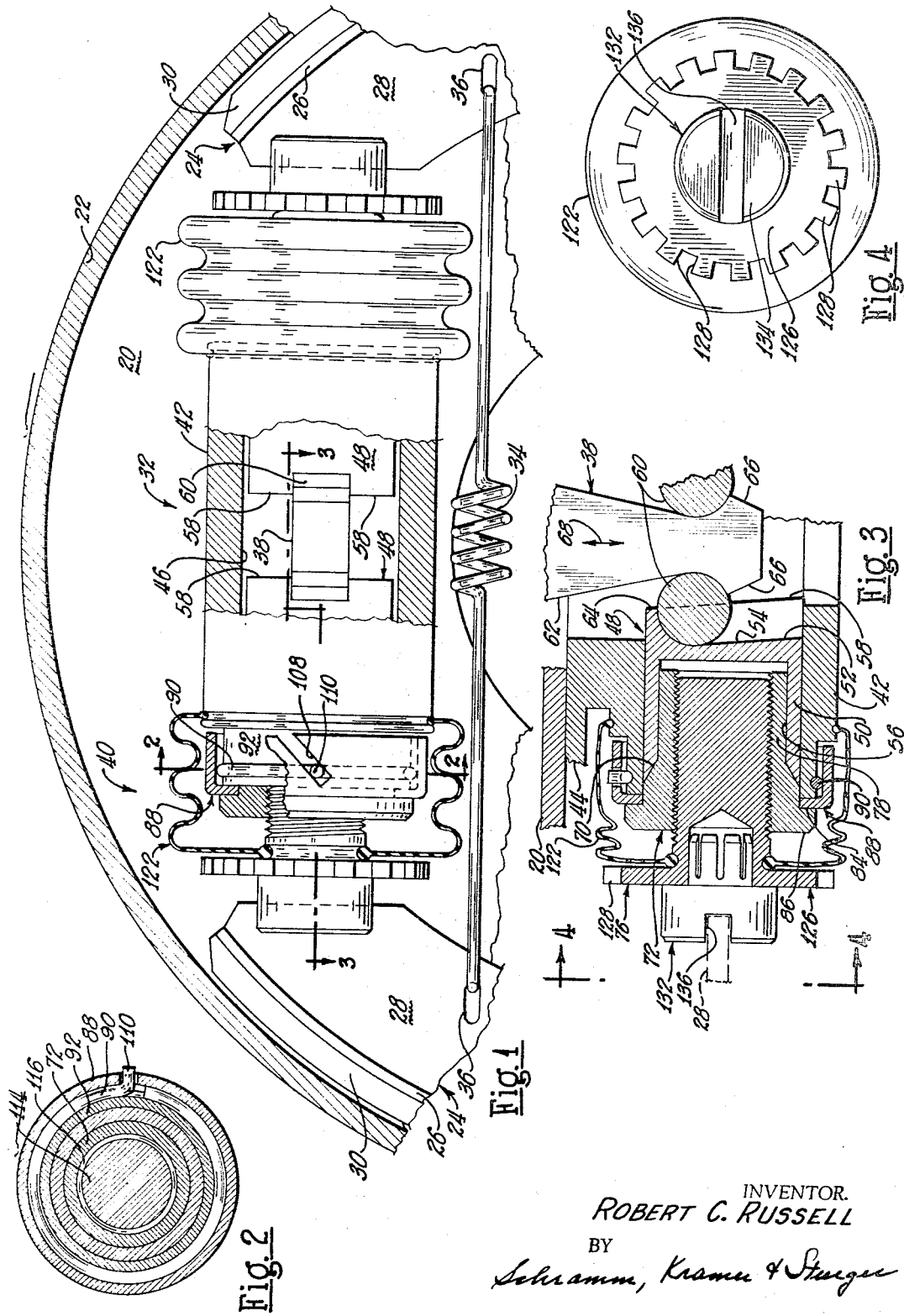

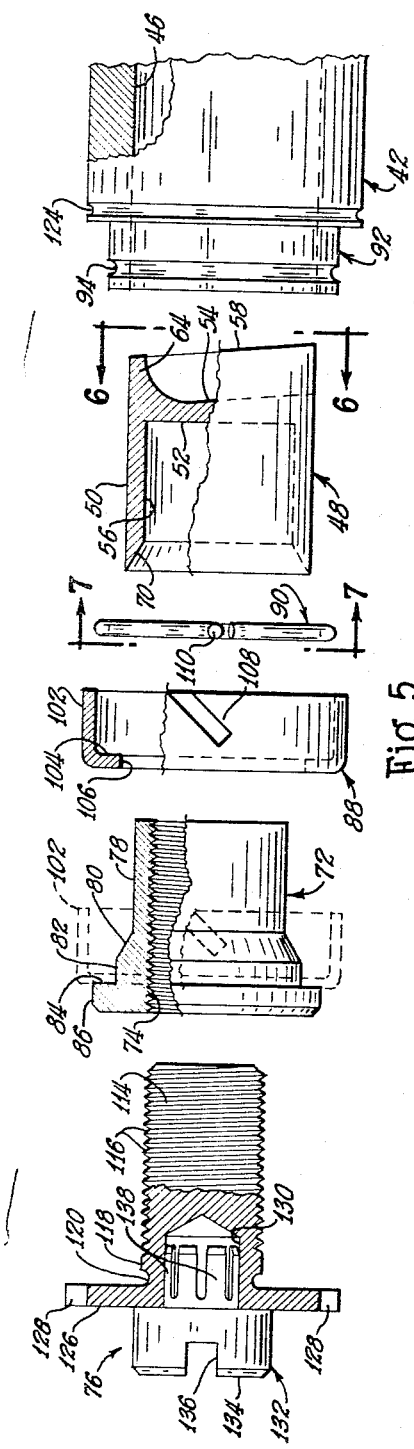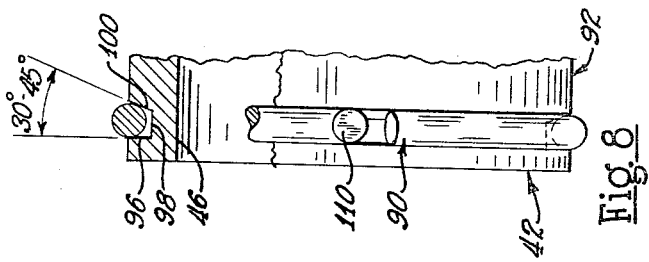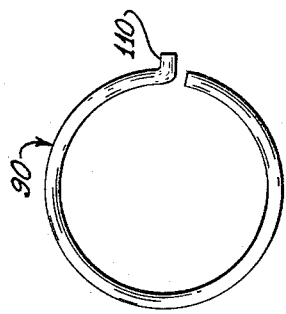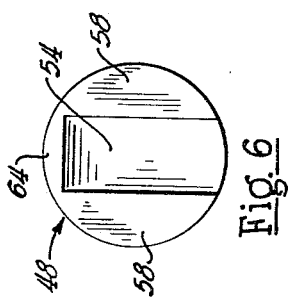

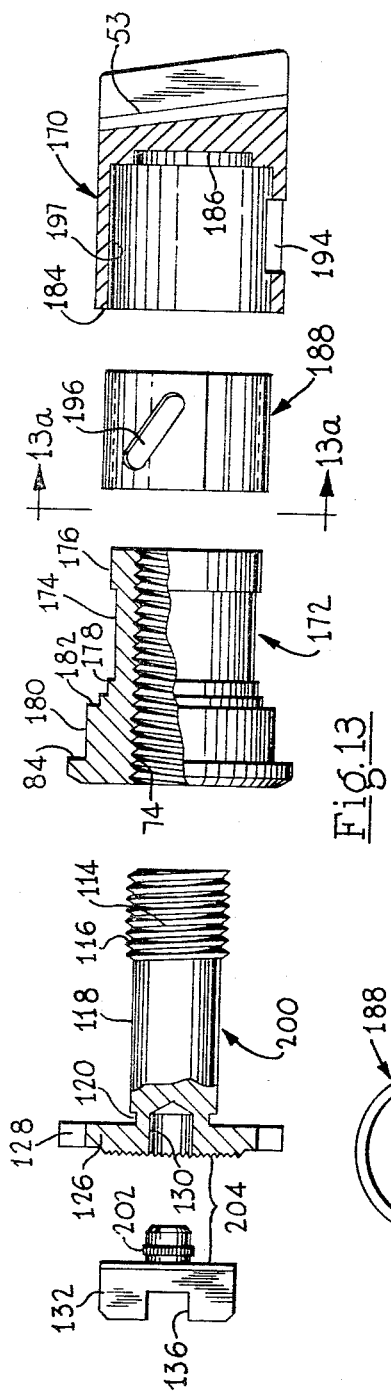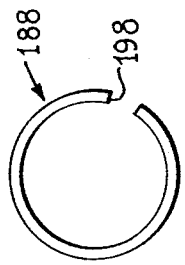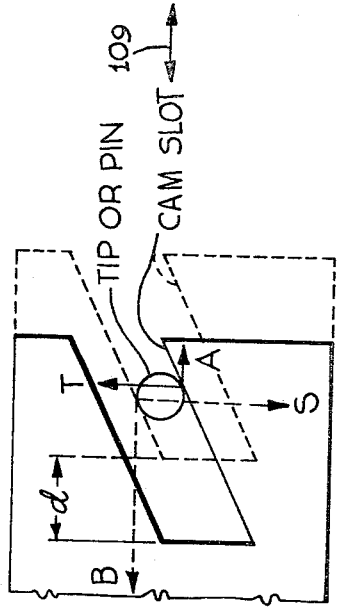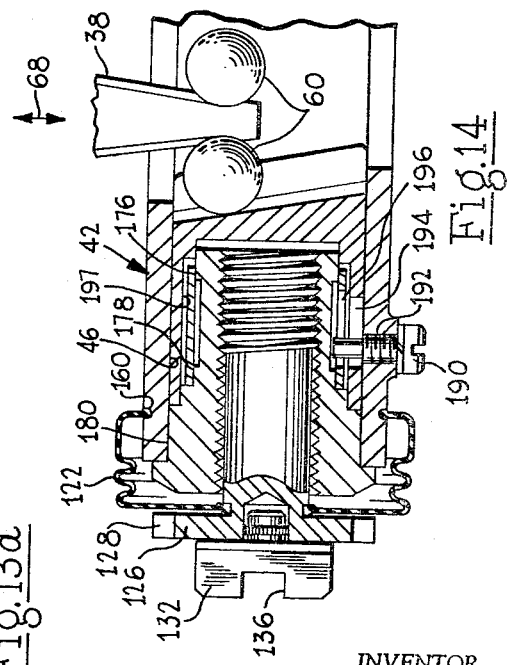

United States Patent Office 3,334,713
Patented Aug. 8, 1967

3,334,713
AUTOMATIC BRAKE ADJUSTER
Robert C. Russell, Asheville, N.C., assignor to Eaton Yale & Towne Inc., Cleveland, Ohio, a corporation of Ohio
Filed Jan. 21, 1966, Ser. No. 527,642
13 Claims. (Cl. 188—196)

This application is a continuation-in-part of application Ser. No. 437,900, filed Mar. 8, 1965, now abandoned.

This invention relates to brake adjusters and more particularly to brake adjusters that are applicable to brakes of the opposed expanding friction shoe type wherein the shoes are operated in combination with an annular drum.

Still further, this invention relates to mechanisms for adjusting brakes on automotive vehicles with the adjustment being effected automatically during actuation of the brakes.

It is an object of this invention to provide an automatic brake adjusting mechanism that is of compact and simplified construction yet rugged and dependable.

A further object of this invention is to provide an automatic brake adjuster that is effective regardless of expansion and contraction of the brake drum due to heating of said drum when stopping tonnage loads of heavy duty vehicles.

A further object is to provide an automatic brake adjuster wherein the adjusting mechanism is yielding under overload pressures encountered in reverse braking.

Other objects of this invention will appear in the following description and appended claims, reference being had to the accompanying drawings forming a part of this specification wherein like reference characters designate corresponding parts in the several views:

FIGURE 1 is a fragmentary front elevational view partly in section of a wedge type brake, and with the operator thereof incorporating the first embodiment of the novel automatic brake adjuster of the present invention;

FIGURE 2 is a sectional view taken along the line 2—2 of FIGURE 1;

FIGURE 3 is a sectional view taken along the line 3—3 of FIGURE 1;

FIGURE 4 is an end elevational view taken along the line 4—4 of FIGURE 3;

FIGURE 5 is an exploded elevational view with parts in section showing the components making up the automatic brake adjuster comprising the first embodiment of the invention;

FIGURE 6 is an elevational view taken along the line 6—6 of FIGURE 5;

FIGURE 7 is an elevational view taken along the line 7—7 of FIGURE 5, of the clutch ring employed in the first embodiment of the invention;

FIGURE 8 is an enlarged fragmentary elevational view, partly in section, of the ring detail of the first embodiment;

FIGURE 9 is a fragmentary axial sectional view, similar to FIGURE 3, with the wedge in elevation, of the second embodiment of the invention at rest or static condition;

FIGURE 10 is a transverse sectional view taken along the line 10—10 of FIGURE 9;

FIGURE 11 is a sectional view similar to FIGURE 9, with parts expanded in a brake applying condition;

FIGURE 12 is an exploded elevational view with parts in section showing the components making up the second embodiment of the invention;

FIGURE 12a is an elevational view taken along the line 12a—12a of FIGURE 12 of the clutch ring employed in the second embodiment of the invention;

FIGURE 13 is an exploded elevational view with parts in section showing the components making up the third embodiment of the invention;

FIGURE 13a is an elevational view taken along the line 13a—13a of FIGURE 13 of the clutch ring employed in the third embodiment of the invention;

FIGURE 14 is a fragmentary axial sectional view, similar to FIGURES 3 and 9, with the wedge in elevation, of the third embodiment of the invention at rest or static condition;

FIGURE 15 is a schematic drawing of the interaction of the clutch ring and the resistance element of the adjuster mechanism.

Before explaining the present invention in detail, it is to be understood that the invention is not limited in its application to the particular construction and arrangement of parts illustrated in the accompanying drawing, since the invention is capable of other embodiments and of being practiced and carried out in various ways. The invention may find application in the control of machine elements, wherein it may be desired to adjust the relative position of one element with respect to another. Also, it is to be understood that the phraseology or terminology emplyed herein is for the purpose of description and not of limitation.

The environment for the invention

As shown in FIG. 1, the environment surroundings for the present invention comprise a brake mechanism as mounted within the confines of a brake drum carried by a vehicle wheel. It is to be understood that an axle carries a rotatable wheel hub and that the wheel is fastened to the hub. An annular brake drum surrounds the hub. The brake mechanism is fastened to a fixed backing plate carried by the axle.

More particularly, according to FIGURE 1, the environment shown typifies that of a heavy-duty road vehicle, such as a truck. Associated with the wheel hub is a backing plate 20, that is non-rotatably carried by the axle.

A brake drum 22 is supported for rotation on the hub, not shown, and extends back over the backing plate 20. The brake drum 22 is oriented to extend transversely of the plane of the backing plate 20, and is an annular element as shown in section in FIGURE 1.

Located within the confines of the brake drum 22 are brake shoes 24, having tables 26 and webs 28.

Friction linings 30 are mounted as by riveting or bonding, not shown, on the tables 26 of shoes 24. The linings 30 are suitably fabricated of an asbestos compound or the like, for appropriate resistance against heat that is generated during brake application by the linings being forced under substantial pressure against the inside of the drum 22 in stopping the vehicle.

A wedge-type brake operator 32 is effective to operate the brake shoes and incorporates the automatic brake adjuster mechanism 40 of the present invention. It is to be understood that the adjuster mechanism 40 may take the form of any of the three embodiments to be described.

The wedge-operator 32 is mounted between opposed ends of the two brake shoes 24 by being secured in a suitable manner, as by bolting, not shown, to the backing plate 20. As the description proceeds, it will become evident that the operator 32 is effective to spread the brake shoes 24 apart when the brakes are applied.

When the brakes are released, the shoes are retracted, along with the mechanism 32 by means of a return spring 34. The return spring 34 has its ends hooked into holes 36, formed in each of the webs 28 of shoes 24. Thus, upon release of brake application force imparted by the operator 32, the linings 30 are returned out of frictional contact with the drums 22.

Application of braking force is effected by a wedge 38, FIGURES 1 and 3, that is adapted to be moved, in this instance, axially of the drum 22 by means of a fluid motor and linkage mechanism, not shown, to power the operator 32.

The invention

The automatic adjuster mechanism 40 of the present invention is actually made a part of the wedge operator 32 and is assembled to operate within an elongated housing 42. The housing 42 is suitably made of cast iron or other metal of appropriate strength, and includes a plate-like attachment flange 44, FIGURE 3. It is by means of the flange 44 that the housing 42 is attached to the backing plate 20. Bolting, welding, or other suitable means, not shown, is effective for this attachment.

Within the scope of the present invention, both ends of the wedge operator 32 may include an automatic adjuster mechanism 40 of the present invention, or only one end may include the adjuster mechanism. A double ended mechanism is illustrated in FIGURE 1, and this can be used for automatically adjusting the clearance of both the brake linings 30 relative to the drum 22.

Within the broad scope of the invention, a wedge operator 32 having but a single adjuster 40, can be used at the top and bottom ends of the shoes 24. The top adjuster 40 can be oriented to adjust the left hand shoe; and at the bottom, the adjuster can be oriented to adjust the right hand shoe.

The double ended mechanism shown can well be used with shoes having the other ends anchored to fixed pivots, not shown, or the other ends can be of the floating type. These various ramifications will be apparent to those skilled in the brake art.

First embodiment (FIGURES 1–8)

Referring now to the left hand side of FIGURES 1 and 3, it will be noted that the housing 42 has a smooth cylindrical bore 46. A wedge piston cup 48 is adapted to reciprocate in sliding contact within the bore 46. The wedge piston cup 48 includes an annular side wall 50 that is slightly smaller in diameter than the diameter of bore 46, to provide a precision sliding fit.

The wedge piston cup 48 also includes an end wall 52 that has an exposed, inclined surface 54. The inside surface of the wall 52 is truly diametrically oriented. The inside of the wedge piston cup 48 is formed as a smooth cylindrical bore 56 to receive an adjuster sleeve 72.

The exposed inclined surface 54 is embraced between two semi-circular lands 58, as shown in FIGURE 6.

A roller 60, FIGURES 1 and 3, operates along the inclined plane surface 54, and is embraced between such surface, the spaced lands 58, and an inclined face 62 of the wedge 38. The rollers 60 are kept in appropriate relationship between the faces 54 and 62 by means of abutments 64, 66. The structure described is exemplary of a roller carrier and modifications within the scope of the invention can be tolerated at this point.

It is to be understood that movement of the wedge 38 in the arrow direction 68 FIGURE 3 will be effective to move the wedge piston cup 48 axially, to and fro, within the bore 46 of housing 42, the return spring 34, FIGURE 1, maintaining engagement of the wedge piston cup 48 with roller 60.

As shown in FIGURES 3 and 5, the left hand end of the side wall 50 of piston cup 48 tapers inwardly as a slanted shoulder 70.

The adjuster sleeve 72 is a tubular element having a threaded bore 74, within which a shoe-actuating screw 76 is threadably carried, and around which a novel clutch mechanism operates to provide automatic compensation for brake lining wear. The exterior of the adjuster sleeve 72 includes a smooth cylindrical portion 78 that is a freely rotatable fit within the cylindrical bore 56 of piston cup 48. At the left hand end of the cylindrical portion 78, there is an outwardly tapering shoulder 80 that is a mate to the inwardly tapering shoulder 70 of wall 50 of piston cup 48.

An enlarged cylindrical portion 82 is formed adjacent to the tapered shoulder 80. This cylindrical portion 82 is of a diameter to provide a precise, but freely rotatable fit within the bore 46 of housing 42.

At the left hand end of the larger cylindrical portion 82, there is a radially extending shoulder 84 where the diameter enlarges to form a head 86. The shoulder 84 provides an abutment by which retraction of the adjuster sleeve 72 and thus the entire movable mechanism back into the bore 46 of housing 42 is limited. The abutting relationship of the shoulder 84 with the end of the housing 42 can be observed in FIGURES 1 and 3, where all parts are shown in a retracted condition.

It will be noted that the adjuster sleeve 72 does not quite bottom against the inside of the end wall 52 of piston cup 48. This reduces frictional drag between the adjuster sleeve 72 and piston cup 48 so that during a compensating or brake adjusting instant, where these two parts necessarily must turn relative to one another, they will be free to do so.

The tapered surfaces 80 and 70 are designed to provide thrust absorbing abutment surfaces for axial force transmission. The friction at the interface of surfaces 80 and 70 prevents rotation of adjuster sleeve 72 relative to piston cup 48 when slight rotational forces are imparted to adjuster sleeve 72. Upon application of greater rotational forces to adjuster sleeve 72 the frictional engagement of surfaces 70, 80 is broken providing relative rotation of the parts 48 and 72 as will be described later.

The clutch mechanism

This mechanism operably includes four components:
 (1) The housing 42 as a resistance element;
 (2) The adjuster sleeve 72;
 (3) A cam ring or reaction flange 88, operably attached to the adjuster sleeve 72; and
 (4) A clutch ring 90. This member is resilient and provides a unique function as will become apparent hereinafter.

In this first embodiment of the invention, the clutch ring 90 operates relative to the outside of a portion of housing 42.

As shown in the drawings, the end of housing 42 terminates in a tubular lip 92. A ring-shaped groove 94 is formed adjacent to the end of lip 92, FIGURE 5.

The cross section of groove 94 is shown in FIGURE 8. Thus, the wall 96, adjacent to the end of tubular lip 92, is radially extended. The bottom 98 is axially oriented. However, the inner wall 100 is slanted radially. It will be noted by the legend on FIGURE 8 that an included angle of 30° to 45° is considered the relatively most efficient orientation between the walls 96 and 100.

By this configuration, the clutch ring 90 can lock into groove 94 very readily, and by the same token, can back up in a sliding manner very readily as well, as will be brought out in the subsequent description.

Use is made of the adjuster sleeve 72 by applying an annular cam ring or reaction flange 88 over the cylindrical portion 82, in abutting relationship to the shoulder 84, i.e., next to the head 86.

The cam ring 88 includes an axially extending tubular portion 102, FIGURE 5, and a radially inwardly extending annular portion 104. The inside diameter 106 of the radial portion 104 is suitably a press fit on the axial cylindrical portion 82 of adjuster sleeve 72.

In the axial portion 102 of cam ring 88, there is a cam slot 108 that is oriented at about 35° to the axis of the cam ring. Cam slot 108 provides rotational movement of the adjuster sleeve 72 as will become apparent hereinafter.

The clutch element of the invention is designated 90 and is formed in the nature of a unitary, but split ring.

An elevational view of the clutch ring 90 is shown in FIGURE 7.

At one end, there is a radially outwardly extended tip 110.

As shown in FIGURES 1, 3 and 8, the clutch ring 90 lies in the groove 94 of tubular lip 92 of housing 42. The radial tip 110 extends out into the slot 108 of cam ring 88. A cooperable relationship is thereby provided between housing 42 and adjuster sleeve 72. It is to be noted that the clutch ring 90 is otherwise free relative to cam ring 88, because of its smaller diameter.

The clutch ring 90 is resilient and will expand and contract, depending upon which direction force tending to rotate it, is applied against the radially outwardly extended tip 110.

When counterclockwise rotational force, as viewed in FIGURE 7, is applied against tip 110, the ring 90 will expand, and slip freely in groove 94 of housing 42.

When clockwise rotational force of a first magnitude is applied against tip 110, the ring 90 will contract into groove 94 and grasp housing 42. This causes clutch ring 90 to become fixed relative to housing 42 under this condition.

When a clockwise rotational force of a second magnitude (greater than said first magnitude) is applied against tip 110, the ring 90 will slip in the groove 94 due to the large included angle defined by walls 96, 100 (see FIGURE 8). This slippage is desirable and indeed necessary as will be shown later. Should the included angle of walls 96, 100 become more acute, as for instance 20°, ring 90 will contract into groove 94 without slippage under a clockwise rotational force of any magnitude (with undesirable effects as will be later described).

Therefore upon application of a counterclockwise rotational force, as viewed in FIGURE 7, at tip 110, ring 90 will expand and slip in groove 94. Upon application of a clockwise rotational force of a first magnitude the ring 90 will contract into groove 94 and lock with respect to housing 42. Due to the large included angle defined by the walls of the groove, a point will be reached upon increase of the clockwise rotational force on tip 110 that ring 90 will slip in groove 94.

In section, the clutch ring 90 as shown, is round. However, the broad scope of the invention would include rod-like as descriptive of the cross section of the clutch 90.

The brake shoe adjusting screw 76 is essentially a solid cylindrical member, with the body portion 114 provided with an external thread 116. The thread 116 is an operable mate in the threaded bore 74 of adjuster sleeve 72.

At this point of the description, it should be noted that the adjustment of screw 76 relative to the wedge 38 of FIGURE 3, through the cooperation of parts 48, 72, 88, 90, and 94, provides the medium through which adjustment or compensation is made for brake lining wear.

At the left hand end of the threaded body portion 114 of the screw 76, there is provided a land 118, having a groove 120 therein. The groove 120 receives one end of a protective boot 122, FIGURES 1 and 3. The other end of the boot 122 fits into a groove 124 on housing 42 to cover and thereby keep foreign materials out of the mechanism.

Beyond the left hand side of the land 118 of the screw 112 there extends radially outwardly an annular disc head 126.

The disc head 126 is provided about its periphery with teeth 128. The teeth 128 are adapted to receive an appropriate tool, not shown, for manual adjustment of the unit, as when the unit is initially manufactured and installed; the brakes are relined; or any other in-service, automatic adjustment, as provided by the present invention.

At the left hand end of the actuating screw 76, there is a coaxial stop bore 130. Into bore 130, there is fitted a brake shoe-engaging plug 132.

The right hand end of the shoe-engaging plug 132 is provided with a plurality of resilient fingers 138. The fingers 138 provide frictional resistance against relative rotation between the screw 76 and the shoe-engaging plug 132.

The brake shoe-engaging plug 132 has a head 134 with a diametrically extending slot 136 therein, FIGURES 5 and 3. The slot 136 embraces the web 28 of a brake shoe 24. The plug 132 and screw 76 are thus held against rotation because of their friction fit and because of the non-rotatable orientation of the web 28 of the brake shoe 24.

The frictional fit between plug 132 and screw 76 permits manual adjustment by forced turning of the toothed head 126 by application of a tool. Otherwise, the plug 132 and screw 76 function as a non-rotatable unit.

From the foregoing, it will be understood that the body portion 114 of the screw 76 is embraced within the threaded bore 74 of adjuster sleev 72. It will also be understood that upon rotational movement of the adjuster sleeve 72 relative to the screw 76, these parts will be axially displaced relative to one another.

During actual operation of the invention in an adjustment instant, the displacement of the two parts is incremental on the order of one half of one thousandth of an inch more or less. This moves the adjuster screw 76 to the left as shown in FIGURES 1 and 3, thus taking up or compensating for any wear of the brake linings 30.

*Operation*

When the wedge 38 is moved transversally of the axis of the piston cup 48 as shown in FIGURE 3, the rollers 60 are forced to roll up the inclined plane surface 54 of piston cup 48.

This moves the piston cup 48 axially to the left and the opposite piston cup (not shown) to the right, to force the brake linings 30 into engagement with drum 22.

During the axial movement, the cam ring 88 is also forced to the left being carried along by the adjuster sleeve 72 as the sleeve is forced by piston cup 48 at abutment surfaces 70, 80.

Due to the fact that tip 110 of the clutch ring 90 is positioned in the angularly disposed cam slot 108 of cam ring 88, movement of cam ring 88 to the left, as shown schematically in FIGURE 15, imparts a counterclockwise rotational force T to tip 110 of clutch ring 90, when viewed in the arrow 2—2 direction of FIGURE 1. Such a counterclockwise rotational force, as previously described, tends to unwind the clutch ring 90 and causes it to slip in groove 94. This slippage permits cam ring 88 and adjuster sleeve 72 to move to the left as shown in FIGURE 3 without rotation. It should be noted that some force is required to unwind the clutch ring 90 and that cam ring 88 and adjuster sleeve 72 could conceivably rotate with respect to piston cup 48 (as the piston cup moves to the left) and thereby accommodate tip 110 of clutch ring 90 without unwinding said clutch ring 90. To prevent rotation of cam ring 88 as piston cup 48 moves to the left (and thereby unwind clutch ring 90) a friction interface is provided at 70, 80. Note from FIGURE 15 that as the cam slot is moved to the left the axial force component A imposed by the tip of the clutch ring acts to the right in the direction of the interface 70, 80 thereby increasing the anti-rotational friction force of the interface 70, 80. In addition, friction is present at the mating threads 74, 114, of the adjuster screw 76 and adjuster sleeve 72. The combination of friction in the threads 74, 114 and at the interface 70, 80 will prevent rotation of cam ring 88 when moved to the left, which non-rotating cam ring will thereby unwind clutch ring 90.

At this point, the piston cup 48, adjuster sleeve 72, cam ring 88, adjuster screw 76 and plug 132 have simply transmitted force from wedge 38 to the brake shoes forcing them into engagement with drum 22. The length of the force transmitting linkage has not changed.

When the brakes are released, as by outward movement of the wedge 38 in the arrow direction 68, FIGURE 3, retraction spring 34, FIGURE 1, moves the entire mechanism back to the right as viewed in FIGURES 1 and 3 and will, after an instant, bottom the shoulder 84 and element 104 against the end of the housing 42. At this point in time as the adjuster screw 76, adjuster sleeve 72, cam ring 88, and piston cup 48, move to the right under the influence of return spring 34, the walls defining groove 108 in cam ring 88 act upon tip 110 of clutch ring 90 imparting a clockwise rotative force S, FIGURE 15, to the clutch ring 90. As previously noted, clockwise rotation of tip 110 of clutch ring 90 tends to wrap clutch ring 90 in groove 94 and lock said clutch ring into said groove of housing 42. With the clutch ring 90 locked with respect to housing 42, cam ring 88 must rotate when moved to the right as viewed in FIGURE 3, in order to accommodate tip 110 in groove 108. Since cam ring 88 is fixed to adjuster sleeve 72, rotation of cam ring 88 will impart rotation to adjuster sleeve 72. As adjuster screw 76 is fixed against rotation due to plug 132 and web 28 a rotation of adjuster sleeve 72 will cause the adjusting screw 76 to be displaced to the left, out of the threaded bore 74 of adjuster sleeve 72. The length of the force transmitting linkage is thereby increased as the linkage is moved to the right as viewed in FIGURE 3 with respect to the housing 42.

It is to be understood that the automatic adjustment does not take place on every stroke of brake application. Adjustment, or a change in force transmitting linkage length, takes place only when tip 110 of clutch ring 90 is rotated in a clockwise direction thereby causing it to wrap into groove 94 of housing 42 becoming locked with respect to said housing 42. FIGURE 15 is a greatly enlarged schematic view of cam slot 108 and tip 110 of clutch ring 90 disposed therein. Note the slot width exceeds the diameter of tip 110. Movement of slot 108 with respect to tip 110 is indicated by arrow 109. Note that slot 108 can move a distance $d$ as indicated in FIGURE 15 without contacting tip 110. This distance $d$ is the "slack" built into the automatic adjuster. Only when axial displacement of piston cup 48, adjuster sleeve 72, and cam ring 88 exceeds the distance $d$ thereby permitting tip 110 to contact the walls defining slot 108 and thereby either wrap or unwrap clutch ring 90 in groove 94, does adjustment take place. Axial travel of cam ring 88 will exceed distance $d$ when, for instance, the brake lining wears. Thus, adjustment is a function of brake lining wear.

*Compensation for brake drum expansion by heating*

As braking is achieved through the interaction of the brake linings and the brake drum, heat is generated in the braking process. The amount of heat is of course dependent on such factors as frequency of brake application, loading of the vehicle, etc. It is to be expected therefore that the brake drum will expand upon heating and it is necessary to provide some sort of clearance between the brake shoes and the brake drum such that heating of the drum with subsequent expansion of said drum will not cause an over compensation such that with drum cooling the shoes bind on the surface of the drum prior to actuation of the brakes. In practice, brake drum expansion on the order of 0.040 of an inch may be encountered. To eliminate a problem of over compensation, a clearance of 0.040 of an inch must be provided between the brake lining and brake shoes to accommodate possible expansion of the drum upon heating. The brake adjuster, of course, must not elongate the force transmitting linkage to decrease this clearance. To this end therefore the diameter of the tip 110 and the width of the slot 108, as viewed in FIGURE 15, must be so determined that a distance $d$ or "slack" will allow a clearance between the brake lining and the brake drum to provide for subsequent expansion by the drum by heating.

*Yielding of the adjuster in reverse braking*

Considering FIGURES 3 and 15, we will now consider the action of the adjuster in a situation of reverse braking. When brakes are applied to a forward moving vehicle and the vehicle is subsequently brought to a stop, the vehicle may rock back before the brakes are released. This situation is critical, particularly if the vehicle has been climbing a hill and the brakes have been applied before the vehicle has reached the top of the hill. A rocking back of the vehicle causes the brake drum, which is in contact with the brake linings, to rotate said linings in a clockwise direction about the vehicle axle. Considering FIGURE 1, a clockwise rotation of drum 22 with brake lining 30 engaged therewith, will force the left brake lining 30 into contact with screw 132 imparting a great compressive force to the left side of the adjuster mechanism. This compressive force, which may be on the order of fifteen thousand pounds, is transmitted from the adjuster screw 76 to the adjuster sleeve 72 and piston cup 48 tending thereby to force the adjuster screw, adjuster sleeve and piston cup to the right. As previously shown, a movement of the adjuster mechanism to the right results in an elongation of the force transmitting linkage due to the fact that clutch ring 90 is wrapped in groove 94, and cam ring 88 is therefore rotated resulting in a slight incremental increase in length of the linkage. However, due to the magnitude of this rocking back compressive force exerted on the left side of the adjuster mechanism and the resulting increased friction forces at the threaded interface of adjuster screw 76 and adjuster sleeve 72, the cam ring 88 and adjuster sleeve 72 are unable to rotate with respect to each other. Something therefore must give, and if no provision is made for yielding in the clutch ring 90, the tip 110 will be sheared off or the slot 108 will be deformed in this reverse braking. It should be emphasized that in normal operation, without reverse braking, the return spring 34, FIGURE 1, exerts a compressive force, on the order of one hundred pounds, on the adjuster screw 76 forcing said screw the adjuster sleeve 72 and the piston cup 48 to the right. Any movement to the right, as previously explained, results in an incremental increase in linkage length if there has been brake lining wear. A force of one hundred pounds is not so great as to prevent a rotation of adjuster sleeve 72 with respect to adjuster screw 76 and normal adjustment proceeds. However, in reverse braking, in addition to the return spring compressive force of one hundred pounds, a reverse braking force on the order of fifteen thousand pounds is imposed on the adjuster screw 76. The increasing friction forces resulting in threads 74 and 116 prevents rotation of members 72 and 76 relative to each other. There is thus a necessity for providing a yielding member within the adjuster mechanism to compensate for the rather large forces encountered in reverse braking. To this end, as was previously pointed out, the included angle between the faces 96 and 100 of groove 94, as seen in FIGURE 8, is made sufficiently large so that ring 90 will slip in groove 94 under the influence of a five thousand pound reverse braking force but will not slip in groove 94 under the influence of a lesser (on the order of one hundred pound) force exerted by the return spring in normal braking operation. Thus the groove walls will allow slippage when the clutch ring is subjected to rather large forces, but not allow slippage when said ring is subjected to forces normally encountered in braking operation. It is seen therefore that the clutch mechanism of this adjuster is not positive in the sense that it will operate in every case when wear in the brake lining is detected but rather it is yielding to prevent damage to the parts of the mechanism under the influence of large forces encountered in reverse braking.

*The second embodiment (FIGURES 9–12)*

Where possible, in order to keep from unduly multiplying the number of reference numerals, parts that are the same or substantially the same will be designated by the same reference numerals used in the preceding description.

The housing 42 FIGURE 12 is essentially the same as previously described and includes a bore 46 in which a piston cup 140 is axially moved by means of a wedge 38 and a cooperating roller or equivalent 60.

The piston cup 140 is distinguishable from the cup of the prior embodiment by the fact that it has a shorter wall 142 than the wall 50 of the prior cup 48.

The cylindrical bore 144 inside it is therefore shorter, but terminates in substantially the same inwardly tapering shoulder 70. The inclined surface 54 and the lands 58 are essentially as shown in FIGURE 6. Also, the abutment 64 on the outside of the end wall is included.

The adjuster sleeve 146 is of somewhat different configuration too, but includes a threaded bore 74. The outer cylindrical portion 148 is shorter to match the shorter bore 144 of piston cup 140. The outward tapered shoulder 80 mates the inward tapered shoulder 70 of piston cup 140. The axially extending cylindrical portion 150 is longer because of the shorter length of the bore 144 of piston cup 140 and the shorter length of the cylindrical portion 148. The radial shoulder 84 and head 86 are substantially the same as before.

*The clutch mechanism*

The clutch mechanism operably includes three components:
(1) The housing 42 as a resistance element;
(2) The adjuster sleeve 146; and
(3) The inside clutch ring 152.

Use is made of the inner surface of the housing 42 in this embodiment of the invention. Tubular lip 92 however is similar to the prior embodiment.

A ring like groove 154 is formed on the inside of the tubular lip 92, adjacent to the end of the lip.

The nature of the groove 154 is generally of the same semi-V construction as in FIGURE 8. However, it is outside in, e.g. it opens into bore 46.

By this arrangement, the clutch ring 152 can lock in easily, and also back up in a sliding manner, very easily as well.

An advantage of this embodiment of the invention resides in the fact that the cylindrical portion 150 of adjuster sleeve 146 is long enough to accommodate a cam slot 156 that is of essentially the same dimensions and opposite orientation as the cam slot 108 of the prior embodiment. Thus, the cam slot has about a 35° orientation to the axis of the unit.

An advantage of this embodiment is appparent by the fact that the cam ring 88 of the prior embodiment is in effect built into the adjuster sleeve 146, resulting in a reduction of the number of parts required.

In this embodiment therefore, the cam slot 156 is "inside" the clutch ring 152, bringing about a different configuration of the clutch ring 152, although it is functionally the same. Thus, it effectively couples the adjuster sleeve 146 to the housing 42.

This clutch ring 152 is also a unitary, but split ring, as shown in elevation in FIGURE 12a.

At one end, there is a radially inwardly extending tip 158.

As shown in FIGURE 10, the clutch ring lies loosely around the outside of the axial cylindrical portion 150 of adjuster sleeve 146.

The radially inwardly extending tip 158 extends down into the slot 156 of the adjuster sleeve 146.

At least the outer portion of clutch ring 152 is cradled within the groove 154 of housing 42.

A cooperative relationship is thereby provided between the inside groove 154 of housing 42 and the adjuster sleeve 146.

The clutch ring 152 is resilient and functions to expand and contract, depending on which direction force tending to rotate it, is applied to the inwardly extending tip 158. It will slip freely in the groove 154 relative to housing 42 when moved in a clockwise direction as viewed in FIGURE 12a because it will contract. It will not grab the adjuster sleeve 146 because enough clearance is provided. However, application of force of a first magnitude against the tip 158 to turn the clutch ring 152 counterclockwise will cause it to expand and grip the housing 42 and become fixed relative to the groove 154 under this condition.

When a counterclockwise rotational force of a second or overload magnitude (greater than said first magnitude) is applied against tip 158, the ring 152 will slip in groove 154 due to the large included angle defined by the walls of the groove as previously described.

The brake actuating screw in this embodiment is the same as described before, including a body portion 114 having a thread 116 thereon. A land 118 has a groove 120 to receive the outer end of a boot 122. A groove 160 on the outside of the lip 92 receives the other end of the boot 122.

A head 126 with adjusting teeth 128 is provided at the left side, as viewed in FIGURES 9 and 12.

The bore 130, receiving a plug 132, with a slot 136 in the head 134, completes the adjusting screw 76.

*Operation*

Referring to FIGURES 9 and 11, it will be noted that movement of the wedge 38 in the arrow direction 68 is effective to displace piston cup 140 to the left and move the head 86 of adjuster sleeve 146 away from the tubular lip 92 of housing 42. This is effective to apply the brakes.

FIGURE 11 illustrates the action that takes place in braking. Note the displacement of the clutch ring 152.

Because of the frictional relationship between the thread 116 on the outside of the adjusting screw 76 and the threaded bore 74 on the inside of adjuster sleeve 146 and the abutment surfaces 70, 80 these parts are locked together. This causes the tip 158 of the clutch ring 152 to abut cam slot 156. As mentioned, clockwise force application on tip 158 contracts the clutch ring 152 and lets its move relative to the groove 154 of housing 42.

Thus, the clutch ring moves relative to adjuster sleeve 146 during the outward movement of the mechanism (the length of the force transmitting linkage does not change). The illustration of FIGURE 11 presumes that there has been a sufficient amount of brake lining wear for an automatic adjustment to take place on the return stroke of the mechanism.

When the brakes are released, by upward movement of wedge 38, in FIGURE 11, frictional engagement of thread 116 of adjusting screw 76 and internal thread 74 of adjuster sleeve 146, and the abutting faces 70, 80 is lessened.

Now, during inward movement of the shoulder 84 toward the housing 42, the cam slot 156 will tend to make the clutch ring 152 back up, counterclockwise. However, counterclockwise application of force against the tip 158 of the clutch ring 152 causes the clutch ring to expand and lock into groove 154 of housing 42.

This will then cause the cam slot 156 to follow the previously displaced tip 158 of clutch ring 152 and rotate adjuster sleeve 146, perhaps a tenth of a turn clockwise. This will cause the adjuster screw 76 to be displaced perhaps a half-thousandth of an inch to the left, out of threaded bore 74 of adjuster sleeve 146. Brake lining wear is thus compensated for in this instant of retracting movement when the brakes are released.

FIGURE 11 is somewhat exaggerated to show the function of the invention clearly. It is to be understood that the automatic compensation described does not necessarily take place on every outward stroke of brake application because brakes obviously do not wear that fast. It only takes place when axial movement of piston cup 140 is sufficient, because of brake lining wear, to cause tip 158 to contact the walls of the adjuster sleeve defining slot 156 and thereby induce the clutch ring to back-up counterclockwise in groove 154. Without brake lining wear tip 158 and slot 156 may move axially a distance "d" with respect to each other as shown schematically in FIGURE 15, without adjustment taking place.

As was described earlier with reference to the first embodiment, the distance d of FIGURE 15 represents the amount of axial travel that the mechanism may undergo without adjustment taking place. In anticipation of the brake drum heating during the braking process and subsequently expanding, distance d must exceed the anticipated expansion of the drum in order to prevent over compensation by the adjuster mechanism with resulting freezing of the brake shoes on the drum surface with drum cooling.

The phenomenon of reverse braking was previously described with reference to the first embodiment and is equally applicable to the second embodiment. As the vehicle is being brought to a stop with the brake shoes engaging the brake drum, a rocking back of the vehicle will cause the brake drum to rotate the brake lining in a clockwise direction with a rotational force of the order of fifteen thousand pounds. As viewed in FIGURE 11, this force is imparted to the adjuster mechanism by means of web 28 and acts to move the entire mechanism within the housing to the right. Presuming that there has been brake lining wear, any movement of the adjuster screw and adjuster sleeve to the right will result in an adjustment as the clutch ring locks in groove 154 and adjuster sleeve 148 rotates with respect to adjuster screw 76. As was previously described, the tremendous forces imparted by reverse braking make it impossible for the adjuster sleeve to rotate with respect to the adjuster screw due to the increased friction force at the threads 74, 116.

In order to prevent the tip 158 of clutch ring 152 from shearing or the slot 156 in adjuster sleeve 148 from becoming deformed, the included angle defined by the walls of groove 154 in housing 42 is made sufficiently large such that clutch ring 152 will slip in groove 154 when subjected to forces of the order of the overload magnitude. As in the first embodiment, this second embodiment provides a clutch ring that will yield when subjected to overload forces encountered in reverse braking thereby eliminating potential damage to the parts making up the clutch mechanism.

Third embodiment (FIGURES 13–14)

As with the first and second embodiments, parts that are the same or substantially the same will be designated by the same reference numerals used in the preceding description.

Housing 42 is essentially the same as previously described and includes a bore 46 in which a piston cup 170 is axially moved by means of a wedge 38 and a cooperating roller or equivalent 60.

The piston cup 170 is distinguishable from the piston cup of the prior embodiments by the fact that abutment 64, of FIGURE 12, has been eliminated as well as tapered surface 70. Surface 53 of the piston cup 170 is otherwise similar to surface 54 of FIGURE 12.

The adjuster sleeve 172 is of somewhat different configuration too, but includes a threaded bore 74. The outer cylindrical portion 174 is bounded by shoulders 176 and 178. The axially extending cylindrical portion 180 has a diameter slightly smaller than the diameter of the bore 46 of housing 42 providing a sliding fit between the adjuster sleeve and the housing. Shoulder 182 of the adjuster sleeve abuts the shoulder 184 of the piston cup. Radially extending shoulder 84 provides an abutment by which retraction of the adjuster sleeve, and thus, the entire movable mechanism back into the bore 46 of housing 42 is limited. Of course it will be noted that the adjuster sleeve 172 does not quite bottom against the inside of the end wall 186 of the piston cup 170.

The clutch mechanism

The clutch mechanism operably includes three components:
(1) The housing 42 and pin member 190 as a resistance element;
(2) the adjuster sleeve 172;
(3) the inside clutch ring 188.

Pin member 190 is received in a threaded bore 192 in housing 42 and includes a tip that extends through the axially disposed slot 194 in the piston cup 170 and the angularly disposed slot 196 in the clutch ring 188.

The clutch ring is a unitary but split cylindrical member as shown in elevation in FIGURE 13a. Near a longitudinal edge 198 of the split ring there is provided a slot 196 angularly disposed to the axis of the ring as in the previous embodiments. This slot may be disposed at any angle to the axis of the ring from 0° to 90°. In the preferred embodiment, an angle of 35° is used although this should not be considered limiting to the nature of this invention. The clutch ring 188 is carried on the adjuster sleeve by shoulders 176, 178, such that the angularly disposed slot 196 has portions thereof in common with the axially disposed slot 194 in the piston cup thereby permitting pin 190 to protrude through both slots. It should be noted that the pin 190 does not bottom on surface 174 of the adjuster sleeve there being provided sufficient clearance between surface 174 and the tip of pin 190 (see FIGURE 14). Also, it should be noted that there is a clearance provided between the clutch ring 188 and the interior wall 197 of the piston cup for purposes to be hereafter described.

The clutch ring 188 is resilient and functions to expand and contract depending whether forces are tending to wrap or unwrap the ring about the adjuster sleeve. With reference to FIGURE 13a if a force is applied to a longitudinal edge 198 of the clutch ring in a clockwise direction, this force will tend to wrap or contract the spring about the adjuster sleeve. Similarly, if a force is applied at the longitudinal edge 198 in a counterclockwise direction, this force will tend to unwrap or expand the spring causing it to slip relative to the adjuster sleeve. Unlike the previous embodiments, the clutch ring in this third embodiment does not employ a tab at the split portion of the ring but rather utilizes a slot in the ring, which slot 196 coacts with pin 190 depending from housing 42 to produce the desired clutching effect as will later be described. As is evident, the cam slot 196 in the clutch ring may be located anywhere on the circumference of the clutch ring, but in the preferred embodiment, the cam slot is located as near to the longitudinal edge 198 defining the split as is possible. This location gives a greater lever arm in unwrapping or wrapping, as the case may be, the clutch ring.

The brake adjusting screw 200 in this embodiment is substantially similar to the adjusting screws described before including a body portion 114 having thread 116 thereon. A land 118 has a groove 120 to receive the outer end of a boot 122. A groove 160, on the outside of the housing, receives the other end of the boot 122.

A head 126 with adjusting teeth 128 is provided at the left side, as viewed in FIGURES 13 and 14.

The bore 130, receiving a plug 132, with a slot 136 completes the adjusting screw. Unlike the embodiment shown in FIGURE 12 where fingers 138 frictionally grip the walls defining the bore 130 to thereby connect the adjusting screw 76 and the plug 132, in this third embodiment, a snap ring 202 is provided on the plug 132 and when received in bore 130, contracts to join plug 132 and the adjusting screw 200. Serrations 204 are provided on the mating surfaces of the adjusting screw and the plug to prevent rotation of the plug with respect to the adjusting screw during automatic adjustment.

Operation

Referring now to FIGURES 13 and 14, it will be noted that movement of the wedge 38 downwardly is effective to displace the piston cup to the left. The adjuster sleeve and adjuster screw are consequently moved to the left forcing the brake linings into contact with the brake drum.

Because of the frictional relationship between the thread 116 on the outside of the adjusting screw and the threaded bore 74 on the inside of the adjuster sleeve and the abutting surfaces 182 of the adjuster sleeve and 184 of the piston cup, these parts are locked together. The cam slot 196 is caused to slip past the pin 190 thereby imparting a counterclockwise directed rotational force to the cam ring as viewed in FIGURE 13a. As previously mentioned, a counterclockwise oriented rotational force directed at the longitudinal edge of the cam ring expands the cam ring causing it to slide relative to the adjuster sleeve.

Of course, the longitudinal slot 194 in the piston cup 170 does not act on the pin during axial movement of the piston cup since it serves only to guide the cup 170 and prevent it from rotating.

Thus, in the brake application portion of the braking cycle, as the piston cup and the adjuster mechanism are moved to the left, as viewed in FIGURE 14, the clutch ring slips on shoulders 176 and 178. This presumes that there has been a sufficient amount of brake lining wear for an automatic adjustment to take place on the return stroke of the mechanism. Sufficient clearance is provided between the interior wall 197 of the piston cup 170 and the exterior surface of the clutch ring 188 such that when the clutch ring expands, it will not contact the surface 197 defining the bore of the piston cup.

When the brakes are released as by upward movement of wedge 38, in FIGURE 14, frictional grip between the threads 116, 74 of the adjusting screw and the adjuster sleeve respectively, and the abutting faces 182, 184 is lessened.

Now, under the influence of the return spring, the piston cup, adjuster sleeve, and adjuster screw move toward the right as viewed in FIGURE 14. The tip of pin 190 disposed within the cam slot 196 of the clutch ring 188 imparts a clockwise oriented rotational force to the clutch ring. However, clockwise application of a rotational force to the longitudinal edge 198 of the clutch ring as viewed in FIGURE 13a causes the clutch ring to contract and lock with respect to the adjuster sleeve.

This will then cause the cam slot 196 to follow the tip of the pin 190 and cause rotation of the adjuster sleeve perhaps a tenth of a turn. This will cause the adjuster screw 200 to be displaced perhaps a half thousandth of an inch to the left out of the threaded bore 74 of the adjuster sleeve. Brake lining wear is thus compensated for in this instant of retracting movement when the brakes are released.

As in the case of the other embodiment, it is to be understood that the automatic compensation described above does not necessarily take place on every inward stroke of brake application because, obviously, brakes do not wear that fast. It only takes place when axial movement of the piston cup is sufficient, because of brake lining wear, to cause the tip of pin 190 to contact the walls of the slot 196 in the clutch ring 188 and thereby induce the clutch ring to wrap around the adjuster sleeve and become fixed thereto. Without brake lining wear, the slot 196 may move axially a distance d as shown schematically in FIGURE 15 without the adjustment taking place.

As in the previous embodiments described, the distance d, as shown in FIGURE 15, must exceed the thermal expansion of the brake drum in order that heating of the brake drum will not result in over compensation of the system.

As described with reference to the previous embodiments, the clutch ring 188 is capable of yielding under the severe overload forces encountered in reverse braking. As previously described, the reverse braking phenomenon imparts rather severe overload forces to the adjusting mechanism causing the piston cup, adjuster sleeve, and adjusting screw to move to the right as viewed in FIGURE 14. This reverse braking force, on the order of fifteen thousand pounds, imparts high frictional forces in threads 74, 116. As was previously described, if there is brake lining wear, any movement of the piston cup, adjuster sleeve, and adjuster screw to the right will result in an incremental elongation of the force transmitting linkage. If, however, the adjuster sleeve cannot rotate with respect to the adjuster screw, there can be no incremental elongation of the linkage mechanism. The clutch ring, however, in spite of the fact that it is being wound in a clockwise direction, will slip on the adjuster sleeve and thereby provide a yielding mechanism within the adjusting device to compensate for the high overload forces encountered in reverse braking.

The action of the clutch mechanism in the adjuster device may be summarized thusly: when the brakes are applied, the adjuster mechanism is carried to the left as viewed in FIGURE 14. Interaction of pin 190 and the slot 196 of the clutch ring 188 unwinds the clutch ring allowing it to slip on the adjuster sleeve permitting the adjuster mechanism to move to the left without a rotation of the adjuster sleeve with respect to the adjuster screw. When the brakes are released, the return spring operates to force the adjuster mechanism to the right as viewed in FIGURE 14. In such a movement to the right, the pin 190 coacts with the cam slot 196 in the clutch ring to cause the clutch ring to wrap about the adjuster sleeve and become fixed thereto. At this point, in order to continue proceeding to the right, the adjuster sleeve 172 must rotate to accommodate the slot 196 in the clutch ring and the pin 190. A rotation of the adjuster sleeve with respect to the adjuster screw results in an incremental elongation of the adjusting mechanism thereby compensating for brake lining wear. Should tremendous overload forces be encountered such that the adjuster sleeve is not able to rotate with respect to the adjuster screw due to the high friction forces present at the interface of threads 74, 116, the clutch ring will slip on the adjuster sleeve allowing the adjuster mechanism to proceed to the right without adjustment.

In all embodiments described, the amount of adjustment during any individual adjusting cycle is dependent upon a number of factors including the pitch of the threads 74, 116, and the amount of rotation of the adjuster sleeve with respect to the adjuster screw. Rotation of the adjuster sleeve, in turn, is a function of the angle of the cam slot with respect to the axis of the mechanism. It is preferred that the slot angle with respect to the axis of the adjuster mechanism be somewhere around 35°.

In the third embodiment as shown in FIGURE 14, the adjuster sleeve 172 is an interference fit with the clutch ring 188 when the parts are assembled. This interference fit is necessary in order to provide initial friction contact between the adjuster sleeve and the clutch ring in order that clockwise oriented rotational forces on the ring, during the return stroke of the adjuster mechanism (to the right in FIGURE 14), will tend to wrap up the clutch ring about the adjuster mechanism locking it thereto. The interference fit therefore insures that the clutch ring will wrap up when edge 198 is subjected to clockwise oriented rotational forces as viewed in FIGURE 13a. Conceivably, if the clutch ring and the adjuster sleeve were fitted together loosely, both clockwise and counterclockwise, rotational forces would simply cause the ring to slip on the adjuster sleeve. The interference fit between the clutch ring and the adjuster sleeve, however, must not be so great that the clutch ring will fail to unwrap in the brake application portion of the cycle or will fail to slip in a reverse braking situation as previously described. In the preferred embodiment, this interference fit is .015 to .025.

This invention is not to be considered limited to this dimension but rather the interference fit may assume any value within the range previously outlined.

*Advantages of the invention*

A simplified and improved automatic brake adjuster has been provided. The parts are of simple construction and easily fabricated. The mechanism is dependable and durable.

All parts are sealed in a compact structure for protection against either loss of lubricant or entry of foreign materials.

The adjuster compensates for both heating of the brake shoes during extended braking periods and also for reverse braking and the high overload froces encountered in this situation.

*Extended scope of invention*

The invention has been shown in a wedge operator. However, it is believed that it will be understood to those skilled in the art that it is logically applicable to hydraulic brakes. Thus, the bore 46 could include an inlet for hydraulic fluid instead of the side opening for the wedge. O-ring sealed pistons could operate behind or as a part of the wedge cups to apply the brakes.

More generally, the invention may be characterized as a force-applying mechanism wherein automatic compensation is provided to account for wear as between working surfaces operatively associated within the mechanism and wherein actuating force is applied through a reliable member suitably supported on a frame or housing for the same.

What is claimed is:

1. In an automatic brake adjuster for brakes having linings that are subject to wear during use,
a housing,
an elongated bore in said housing,
piston means reciprocable within said bore,
means for applying axial force to said piston means to produce reciprocable movement thereof within said bore,
an adjuster sleeve positioned within said housing and rotatable relative to said housing,
thrust absorbing abutment means between said piston means and said adjuster sleeve,
an axially oriented, threaded bore within said adjuster sleeve,
a brake-engaging screw carried within said threaded bore of said adjuster sleeve and movable axially of said adjuster sleeve upon relative rotation between said sleeve and said screw,
means restraining said screw against rotation,
and clutch means operably associated with said housing and responsive to an axial movement of said piston means in a first direction to transform said axial motion of said piston means into rotational movement of said adjuster sleeve while remaining non-responsive to an axial movement of said piston means in a second direction, said clutch means including a split clutch ring disposed between a portion of said adjuster sleeve and said housing and means to expand or contract said clutch ring.

2. The invention of claim 1 in which said clutch means is further defined by a cam ring operably secured to said adjuster sleeve, said cam ring having a cam slot in a cam portion movable in overlying relation to a portion of said housing, and a clutch ring operably interposed between said housing portion and said cam ring, said clutch ring having a radially outwardly extending projection slidably engageable with said cam slot, whereby said clutch ring is adapted to expand and slide on said housing on application of force against said projection in one direction of rotation, and contract and lock to said housing on application of force against said projection in the opposite direction of rotation.

3. The invention of claim 2, wherein said portion of said housing overlaid by said cam ring includes a groove to at least partially cradle said clutch ring and prevent axial movement thereof realtive to said bore,
and said groove being of generally V-shaped cross section,
whereby said clutch ring can move freely relative to said housing upon being expanded, and readily grip said housing on being contracted.

4. The invention of claim 2, wherein said portion of said housing that is overlaid by said cam ring includes an endless groove to at least partially cradle said ratchet clutch ring and prevent axial movement thereof relative to said bore,
said groove having a first wall that is radially oriented relative to said bore and a second wall spaced from said first wall, the second wall being slanted relative to said first wall,
and said walls having an included angle therebetween in the range from about 30° to about 45°,
whereby said clutch ring can move freely relative to said housing upon being expanded, and readily grip said housing upon being contracted by a first force but slip on said housing upon application of a second force of similar direction but larger magnitude than said first force.

5. The automatic brake adjuster of claim 1 in which said clutch means is further defined by a cam slot on the exterior of said adjuster sleeve, retaining means in said bore of said housing, and a clutch ring positioned around said adjuster sleeve and engaged by said retaining means of said bore, said clutch ring having a radially inwardly extending projection slidably engageable within said cam slot, whereby said clutch ring is adapted to contract and slide relative to said housing retaining means on application of force against said projection tending to rotate said clutch ring in one direction, and expand and lock to said housing retaining means on application of force against said projection tending to produce the opposite direction of rotation.

6. The invention of claim 5 wherein said retaining means in said bore of said housing is a circumferentially extending groove of generally V-shaped section, and opening inwardly into said bore of said housing,
whereby said clutch ring can move freely relative to said housing upon being contracted, and readily grip said housing on being expanded.

7. The invention of claim 5 wherein said retaining means in said bore of said housing is a circumferentially extending endless groove,
said groove having a first wall that is radially oriented relative to said bore, and a second wall spaced from said first wall, the second wall being slanted relative to said first wall,
and said walls having an included angle therebetween in the range from about 30° to about 45°,
whereby said ratchet ring can move freely relative to said housing upon being contracted, and readily grip said housing upon being expanded by a first force but slip on said housing upon application of a second force of similar direction but larger magnitude than said first force.

8. The automatic brake adjuster of claim 1 in which said clutch means is further defined by a longitudinally split clutch ring carried by said adjuster sleeve, said clutch ring having a cam slot on the exterior surface thereof, and a radial pin member depending from the wall defining the housing bore said pin having a tip disposed in said cam slot whereby said clutch ring is adapted to expand and slide on said adjuster sleeve on application of force against the walls defining said cam slot in one direction of rotation, and contract to lock to said adjuster sleeve on application of force against the walls defining said cam slot in the opposite direction of rotation.

9. The invention of claim 8 in which said split clutch ring is cylindrical and is carried by at least one cylindrical portion of the adjuster sleeve.

10. The invention of claim 8 in which said clutch ring is defined by a longitudinally split hollow cylindrical member carried by at least one cylindrical surface of the adjuster sleeve.

11. The invention of claim 10 in which the clutch ring and cylindrical surface of the adjuster sleeve are in an interference fit relationship whereby upon application of a force in a first direction against the walls defining said cam slot, said clutch ring will contract and lock to said adjuster sleeve.

12. The invention of claim 8 in which the cam slot is disposed at an angle to the axis of the housing bore and the cam slot width exceeds the diameter of the pin disposed therein thereby permitting a limited axial movement of the clutch ring with respect to the pin.

13. In an automatic adjuster for brakes having linings that are subject to wear during use,
   a housing
   an elongated bore in said housing
   piston means reciprocable and axially movable along said bore
   means for applying axial force to said piston means to produce reciprocable movement along said bore,
   an annular adjuster sleeve having portions positioned within said housing and axially rotatable relative to said housing,
   axial thrust absorbing means between said piston means and said adjuster sleeve,
   a coaxially oriented, threaded bore within said adjuster sleeve,
   a brake shoe-engaging screw carried within said threaded bore of said adjuster sleeve and movable axially of said adjuster sleeve upon relative rotation between said adjuster sleeve and said screw,
   means restraining said screw against rotation,
   a circular clutch ring having a longitudinal split therein interposed between said adjuster sleeve and said housing,
   means responsive to an axial movement of said piston and said adjuster sleeve in a first direction to impart a rotational force to said clutch ring to cause said ring to move into wedging engagement with either said housing or said adjuster sleeve, and while said clutch ring is in wedging engagement with said housing or said adjuster sleeve, to transform further axial motion of said piston means into rotational movement of said adjuster sleeve relative to said housing,
   said means reacting to an axial movement of said piston and said adjuster sleeve in a second direction to impart a rotational force to said clutch ring to cause said ring to rotate relative to said housing and said adjuster sleeve and thereby permit said adjuster sleeve to move axially with respect to said housing in non-rotating relationship.

References Cited
UNITED STATES PATENTS

| | | | |
|---|---|---|---|
| 2,184,683 | 12/1939 | Shuman | 188—79.5 |
| 2,889,896 | 6/1959 | Schultz et al. | 188—79.5 X |
| 3,068,964 | 12/1962 | Williams et al. | 188—79.5 |

DUANE A. REGER, *Primary Examiner.*